Feb. 3, 1931. I. O. MALL Re. 17,947

RESILIENT RAIL ANCHORAGE

Original Filed May 1, 1929 2 Sheets-Sheet 1

Inventor

Ivor O. Mall.

By R. S. C. Dougherty.

Attorney

Feb. 3, 1931. I. O. MALL Re. 17,947

RESILIENT RAIL ANCHORAGE

Original Filed May 1, 1929 2 Sheets-Sheet 2

Inventor

Ivor O. Mall.

By R. S. C. Houghenty.

Attorney

Reissued Feb. 3, 1931

Re. 17,947

UNITED STATES PATENT OFFICE

IVOR O. MALL, OF NEW ORLEANS, LOUISIANA, ASSIGNOR TO BETHLEHEM STEEL COMPANY, A CORPORATION OF PENNSYLVANIA

RESILIENT RAIL ANCHORAGE

Original No. 1,739,158, dated December 10, 1929, Serial No. 359,506, filed May 1, 1929. Application for reissue filed June 25, 1930. Serial No. 463,799.

This invention relates to a resilient anchorage for rails and has for its object to provide a resilient supporting and holding means for rails which will absorb or dissipate the vibrations set up in the rails and eliminate the deleterious effect such vibrations have on the foundation in which or to which such rails are usually secured.

A steel rail supported and anchored at spaced points deflects under the action of a moving wheel load and this deflection moves along as a wave in the rail. This deflection occurs in conjunction with a high-pitched vibration imparted to the rail by the rolling wheels as well as vibrations transmitted to the rail from the rolling stock itself. Such vibration is either dissipated by the rail through its securing means or is transmitted to the foundation to which the rail is secured.

Where the steel rail is rigidly anchored to steel members that are embedded in a concrete foundation, the deflection and vibration in the rail are arrested at the point of anchorage, thereby causing excessively high stresses to be set up in the rigid anchorage and a premature failure of such connection. The effect of arrested movement and vibration is transmitted to the concrete surrounding the anchorage, and since the structure of concrete is such that it cannot absorb or dissipate vibration without deterioration, the bond between the concrete and steel is broken, and moisture which may then enter hastens the destruction of the foundation.

The ideal anchorage for a rail is one which provides a positive fastening of the rail to the foundation yet which will absorb or dissipate the vibration and permit the deflection which takes place in the rail under the rolling load.

It is therefore the object of my invention to provide a resilient anchorage for rails which will allow limited vertical transverse and longitudinal movement between the rail and its foundation and which will absorb or dissipate the vibrations set up in the rail.

A further object is to provide a resilient rail anchorage which is strong and durable and which will materially increase the life of the foundation to which the rails are secured.

With these and other objects in view which will appear from the following description, the invention resides in the novel features of construction and combination of parts hereinafter described and particularly pointed out in the appended claims.

In the drawings Fig. 1 is a top plan view of the resilient rail anchorage assembled as taken on the line 1—1 of Fig. 2, the rail being shown in section.

Figure 1:
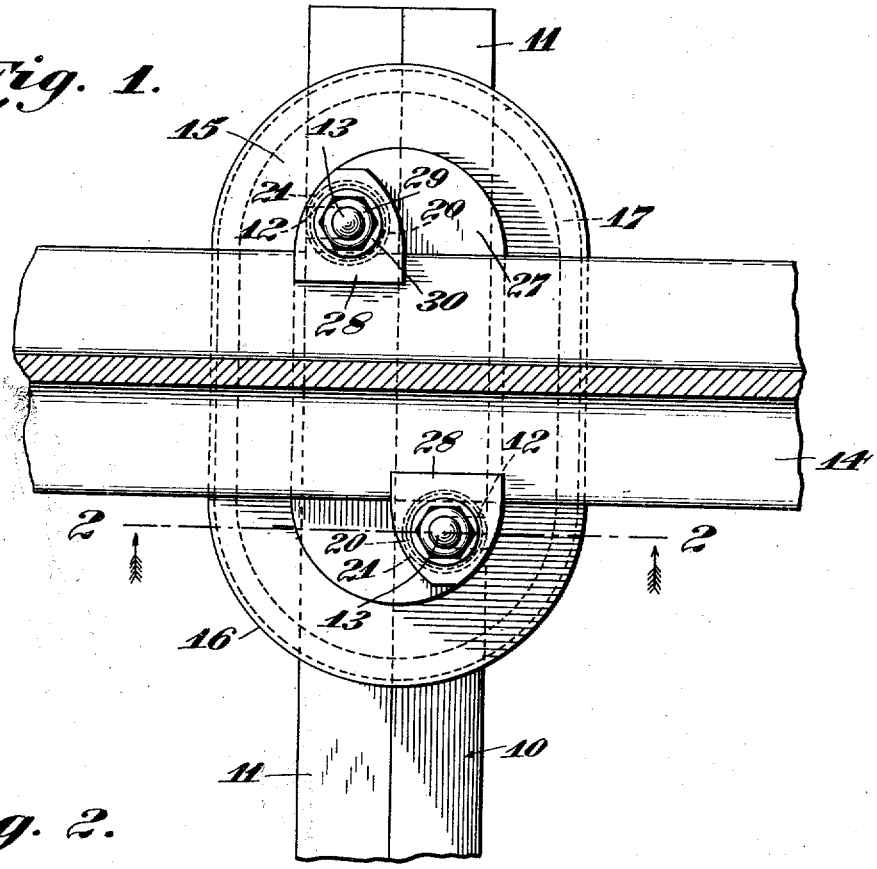
Figure 2:
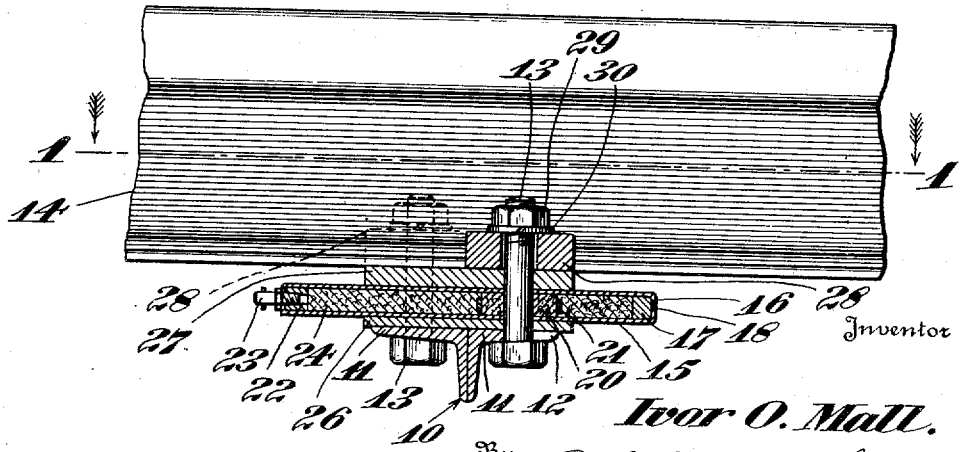
Fig. 2 is a transverse vertical section through the resilient anchorage on the line 2—2 of Fig. 1.

Describing the embodiment of my invention illustrated in the accompanying drawings, 10 designates the anchor bar which is customarily embedded in the reinforced concrete foundation of the street pavement. This bar may extend between the opposite rails, but in the usual construction where a reinforced concrete foundation is used, these anchor bars are merely embedded in the concrete at predetermined distances along the length of the rail.

In the forms illustrated the anchor bar 10 comprises two angle bars welded together with opposite horizontal flanges 11 provided with notches 12 to receive the anchor bolts 13 by which a rail 14 may be secured thereto.

Interposed between the rigid anchor bar 10 and the rail 14 is a resilient diaphragm assembly which in the form illustrated comprises two similar oval-shaped resilient steel plates 15 provided with peripheral flanges 16. Fitting closely within the flanges 16 and between the plates 15 when they are arranged in opposed relation is a ring frame member 17 which provides a reinforcement for the peripheral portion of the diaphragm. The flanges 16 which are in abutting relation are welded together and to the frame 17 as at 18 around the entire periphery of the diaphragm providing a hermetically sealed container. The diaphragm is provided with bolt receivink apertures spaced so that when it is placed on the anchor bar 10 they will align with the notches 12. Within the diaphragm and arranged concentric with the bolt receiving apertures are asbestos-fiber gaskets 20 each encircled by a steel band ring 21, the gaskets being of a size to fit snugly about the anchor bolts 13 and between the plates 15 to form a tight joint under the pressure of the fluid substance contained in the disphragm. At a suitable point in the periphery of the diaphragm the plates 15 and frame 17 are provided with a threaded aperture 22 in which is secured a valved nipple 23 through which an asphalt asbestos mixture 24 with which the diaphragm is filled may be injected.

Between the anchor bar 10 and the lower plate 15 of the diaphragm is a load plate 26 similar in shape to the diaphragm but materially smaller in size so that it will bear only on the center portion of the diaphragm. Above the diaphragm is a similar load plate 27 on which the rail 14 rests. The plates 26 and 27 are provided with apertures to receive the anchor bolts 13, the bolts being spaced to receive the bottom flange of the rail between them. Clips 28 which fit over the upper end of the bolts 13 engage over the bottom flange of the rail 13 and by means of the nuts 29 acting with lock washers 30 the rail, load plates and diaphragm are clamped together and to the anchor bar 10.

The semi-solid asphalt-asbestos mixture 24 is forced into the diaphragm under pressure, and due to the resilient nature of the anchorage and the nature of the asphalt-asbestos cushion on the inside of the diaphragm the vibrations transmitted through the rail are absorbed and dissipated.

The asphalt-asbestos mixture is compressible to some degree when confined in the diaphragm so that it permits a slight flexing of the plates 15.

It is, of course, apparent that other compressible material might be used in place of the asphalt-asbestos mixture, the essential requirements being that it must remain plastic under varying degrees of temperature. The asphalt used should be such that it will not become brittle at temperatures normally encountered nor should it melt at temperatures up to 150° F. The asbestos fibers in the asphalt add to the plasticity and compressibility of the cushion.

The resiliency of the anchorage is gained principally through the diaphragm section of the steel plates 15, and the plastic asphalt-asbestos cushion furnishes the necessary stability to the plates and absorbs the vibrations transmitted thereto. The asphalt, being an inert substance, protects the inside of the diaphragm from corrosion.

Figure 3:
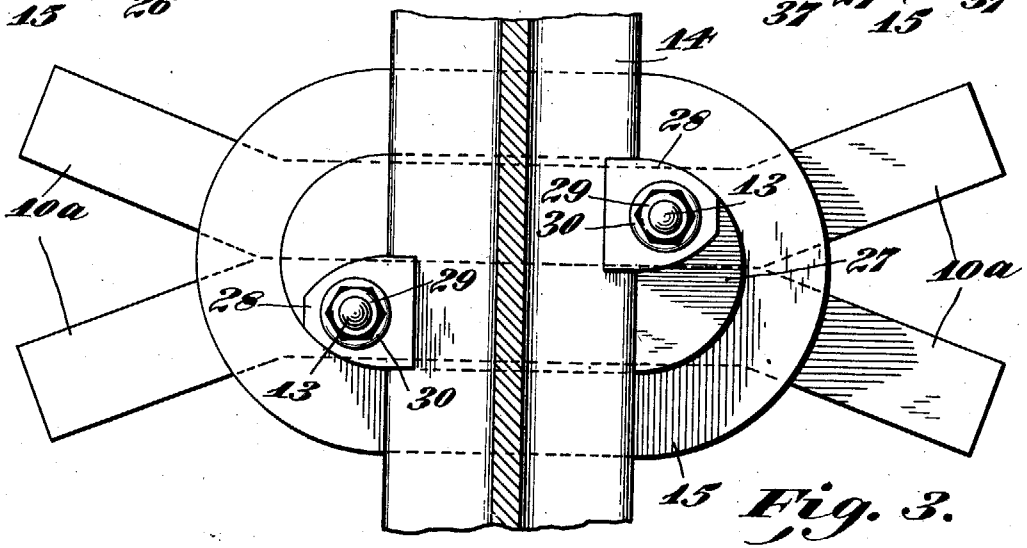
Fig. 3 is a view similar to Fig. 1 showing a modified form of anchor bar construction.

In Fig. 3 I have shown a slightly modified form of anchor bar 10 particularly designed for use in reinforced concrete foundations for the rails where no cross ties are used. In this form the ends 10[a] of the anchor bar 10 are spread apart so that the same will be held more firmly in the concrete when it sets about them.

Figure 4:
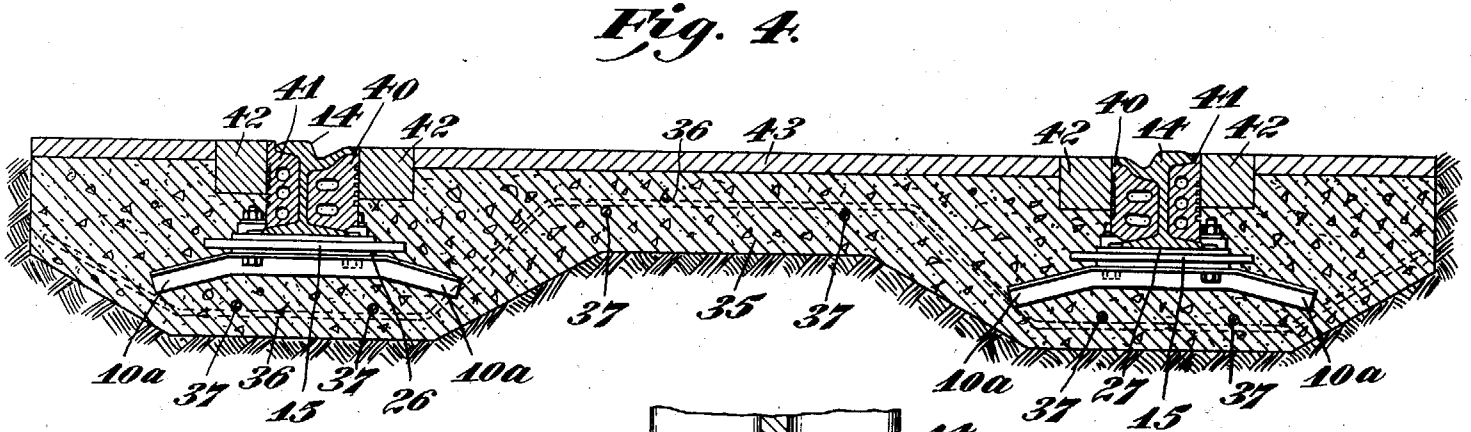
Fig. 4 is a transverse sectional view of a portion of railway track in which the resilient anchorages are incorporated.

In Fig. 4 I have illustrated one type of track construction where no cross ties are used. In this construction the concrete 35 reinforced by the steel rods 36 and 37 alone serves to hold the two rails 14 parallel and in proper alignment. The anchor bars 10, to which the rails 14 are attached with the resilient diaphragm 15 and load plates 26 and 27 interposed therebetween, are embedded in the concrete 35. In the sides of the rails 14 are placed pre-formed elastic fillers 40 and 41, and embedded in the concrete against which the outer faces of the fillers bear are granite block stretchers 42, and the usual asphalt paving 43 covers the concrete 35 and extends flush with the top of the stretchers. By such a construction a limited movement of the rail is permitted without such movement affecting the paving construction or foundation.

As far as the function of the resilient rail anchorage is concerned the anchor bars 10 might be replaced by cross ties which extend between the rails 14. With a resilient anchorage for the rails which will effectively absorb or dissipate the vibrations set up in the rail, however, the cross tie type of anchor bar becomes no longer necessary since the bond between the bars 10 and the concrete remains secure.

With the rails secured at spaced points along their length by the resilient anchorage assemblies above disclosed to anchor bars embedded rigidly in reinforced concrete, it will be apparent that under the influence of the rolling load the rail may give slightly, due to the resiliency of the diaphragm, and the longitudinal stresses which would normally be built up are released since a limited longitudinal as well as vertical movement of the rail is possible.

While the movement of the rail in the anchorage is not perceptible, it is of sufficient magnitude to ease the shock on the fastening and minimize the developed stresses. The wave action in the rail occurs without interruption, the nature of the wave being controlled by the mechanical action of the resilient diaphragm. Due to the absence of frictional movement between the component parts of the assembly the amount of movement in the rail does not increase and the nature of the movement is uniform during the entire service life of the anchorage. This feature allows the maximum length of service to be obtained from the pavement construction.

Having thus described my invention, what I claim is:

1. In a resilient anchorage for rails, the combination of an anchor member rigidly secured to a foundation, of a rail member secured thereto, a resilient metallic supporting member interposed between said anchor member and rail and mounted to flex under the vibrations of the load passing along said rails and vibration absorbing means against which said resilient means acts to prevent transmission of the vibrations to said anchor member.

2. In a resilient anchorage for rails, the combination of an anchor member rigidly secured to a foundation, of a rail member secured thereto, a resilient metallic supporting member interposed between said anchor member and rail and mounted to flex under the load passing along said rail to permit slight relative movement between the rail and anchor member and thereby prevent the building up of stresses at the anchorage, and a non-metallic vibration absorbing material associated with said resilient member for absorbing vibrations transmitted thereto.

3. In a resilient anchorage for rails, the combination of an anchor member rigidly secured to a foundation, of a rail member secured thereto, a resilient supporting unit interposed between said anchor member and said rail member, said unit including a resilient metallic plate, means at opposite edges of said plate for engaging one of said members whereby the intermediate portion of the plate is spaced from such member, and means on the opposite side of said plate intermediate of and spaced from said edges engaging the other member whereby the said opposite edges of the plate are spaced from said other member, and means for clamping the rail and resilient unit to said anchor member.

4. In a resilient anchorage for railroad rails, the combination of an anchor member and a rail member secured thereto, a resilient supporting unit interposed between said anchor member and said rail member, said unit including a pair of plates, means interposed between said plates for spacing the same apart, means on the outer side of one of said plates and spaced laterally from the said spacing means engaging the anchor member for supporting the unit therefrom, means on the outer side of the other plate and spaced laterally from the spacing means engaging the rail and on which the rail is supported, and means for securing the rail and resilient unit to said anchor member.

5. In a resilient anchorage for railroad rails, the combination of an anchor member and a rail member secured thereto, a resilient supporting unit interposed between said members, said unit including a pair of plates, means about the outer edges of said plates spacing the intermediate portions of the plates apart throughout substantially their entire area, a bearing member on the under side of the lower plate intermediate of and spaced inwardly from its edges engaging the anchor member for spacing the remaining portion of the plate from such anchor member, a bearing member on the upper side of the top plate intermediate of and spaced inwardly from its edges on which the rail is supported, the remaining portion of the top plate being spaced from the rail, and means securing said rail and resilient unit to the anchor member.

6. In a resilient anchorage for railroad rails, the combination of an anchor member and a rail member secured thereto, a resilient supporting unit interposed between said anchor member and said rail member, said unit including a pair of plates, means about the outer edges of said plates for spacing the same apart throughout substantially their entire area, a supporting member interposed between the center portion of the lower plate and the anchor member, a second supporting member interposed between the center portion of the top plate and the rail, and bolt means securing the rail and resilient unit to said anchor member.

7. A resilient anchorage for railroad rails including in combination a rigid anchoring and supporting member, a rail and a resilient supporting unit interposed between said supporting member and rail adapted to dissipate and absorb vibrations therefrom, said unit comprising a pair of spaced resilient metallic plates hermetically sealed together about their edges providing a resilient diaphragm, means for supporting said diaphragm on said support from the lower plate, means for supporting the rail from the upper plate, and means for clamping the rail and resilient unit to said supporting member.

8. A resilient anchorage for railroad rails including in combination a rigid anchoring and supporting member, a rail and a resilient supporting unit interposed between said supporting member and rail adapted to dissipate and absorb vibrations therefrom, said unit comprising a pair of spaced resilient metallic plates hermetically sealed together about their edges providing a resilient diaphragm, said diaphragm being filled with a non-metallic vibration absorbing material, said unit being supported by said anchor member and serving as the support for the rail member, and a spacer between one of the plates and the adjacent member located in the central portion of the plate, spacing the edges of the plate from said rail member whereby the resilience of said plate is utilized in supporting said rail.

9. A resilient anchorage for railroad rails including in combination a rigid anchoring and supporting member, a rail and a resilient supporting unit interposed between said supporting member and rail adapted to dissipate and absorb vibrations therefrom, said unit comprising a pair of spaced resilient metallic plates hermetically sealed together about their edges providing a resilient diaphragm, said diaphragm being filled with a non-metalic semi-fluid vibration absorbing material, means for supporting said diaphragm on said anchor member from the central portion of the lower plate, means for supporting the rail from the center portion of the upper plate, and means for clamping the rail and resilient unit to said supporting member.

10. A resilient anchorage for railroad rails including in combination a rigid anchoring and supporting member, a rail and a resilient supporting unit interposed between said supporting member and rail adapted to dissipate and absorb vibrations therefrom, said unit comprising a pair of spaced resilient metallic plates hermetically sealed together about their edges providing a resilient diaphragm, said diaphragm being filled with an asphalt-asbestos mixture for absorbing vibrations transmitted thereto, means for supporting said diaphragm on said anchor member from the central portion of the lower plate, means for supporting the rail from the center portion of the upper plate, and means for clamping the rail and resilient unit to said supporting member.

11. A resilient anchorage for railroad rails including in combination a rigid anchoring and supporting member, a rail and a resilient supporting unit interposed between said supporting member and rail adapted to dissipate and absorb vibrations therefrom, said unit comprising a pair of spaced resilient metallic plates hermetically sealed together about their edges providing a resilient diaphragm, means for supporting said diaphragm on said anchor member from the center of the lower plate, means for supporting the rail from the center portion of the upper plate, said supporting member and diaphragm having aligned apertures, bolts extending through said apertures, and means on said bolts for engaging the rail to hold the rail and resilient unit securely to said support.

12. A resilient anchorage for railroad rails including in combination a rigid anchoring and supporting member, a rail and a resilient supporting unit interposed between said supporting member and rail adapted to dissipate and absorb vibrations therefrom, said unit comprising a pair of spaced resilient metallic plates hermetically sealed together about their edges providing a resilient diaphragm, said diaphragm being filled with a non-metallic semi-fluid vibration absorbing material, means for supporting said diaphragm on said anchor member from the center of the lower plate, means for supporting the rail from the center portion of the upper plate, said diaphragm having bolt receiving apertures therethrough, bolts extending through said aperture and engaging the supporting member and rail for holding the rail securely to said support, and sealing members within said diaphragm about said bolts for preventing the vibration absorbing material from escaping thereabout.

13. A resilient supporting unit for rails comprising a pair of spaced plates hermetically joined together about their edges and providing a flexible resilient diaphragm, the center portions of the plates being adapted to receive and support the rail and its load.

14. A resilient supporting unit for rails comprising a pair of spaced plates, a ring-like frame member conforming to the peripheral shape of the plates interposed between said plates for spacing the same apart, said plates being hermetically sealed to said frame to provide a fluid-tight diaphragm unit, the center portion of one of the plates being adapted to carry the weight of the rail and its load.

15. A resilient supporting unit for rails comprising a pair of spaced plates hermetically joined together about their edges and providing a flexible resilient diaphragm, the center portion of one of the plates being adapted to receive and support the rail and its load, said diaphragm being filled with a non-metallic vibration absorbing material.

16. A resilient supporting unit for rails comprising a pair of spaced plates, a ring-like frame member conforming to the peripheral shape of the plates interposed between said plates for spacing the same apart, said plates being hermetically sealed to said frame to provide a fluid-tight diaphragm unit, the center portion of one of the plates being adapted to carry the weight of the rail and its load, said diaphragm being filled with a non-metallic vibration absorbing material.

17. A resilient supporting unit for rails comprising a pair of spaced resilient metallic plates each provided with a peripheral flange extending to one side thereof, said plates being arranged together with the flanges in abutting relation and hermetically sealed one to the other, providing a fluid-tight diaphragm unit, the center portion of one of the plates being adapted to carry the load of the rail which may be supported thereon.

18. A resilient supporting unit for rails comprising a pair of spaced resilient metallic plates each provided with a peripheral flange extending to one side thereof, said plates being arranged together with the flanges in abutting relation and hermetically sealed one to the other, providing a fluid-tight diaphragm unit, the center portion of one of the plates being adapted to carry the load of the rail which may be supported thereon, said diaphragm being filled with a non-metallic vibration absorbing material.

19. A resilient supporting unit for rails comprising a pair of spaced resilient metallic plates each provided with a peripheral flange extending to one side thereof, said plates being arranged together with the flanges in abutting relation and hermetically sealed one to the other, providing a fluid-tight diaphragm unit, said plates being provided with spaced sets of aligned bolt receiving apertures, gasket members arranged to fit closely between said plates and provided with bolt receiving apertures concentric with the apertures in said plates, said diaphragm being provided with a fluid-receiving opening whereby a fluid material may be injected therein under pressure.

20. In a reinforced concrete foundation for railroad rails the combination of spaced anchor bars rigidly secured therein, rails secured to said bars, resilient metallic vibration units interposed between said anchor bars and rails to prevent the vibration of said rails from being transmitted to said anchor bars, said units including resilient metallic diaphragms, said diaphragms being filled with a vibration absorbing body, and means for securing the rails and vibration absorbing units to said anchor bars.

21. A rail support comprising a pair of dished plates in opposed abutting relation at their extending marginal edges, means to mechanically join said edges, and a vibrating absorbing material contained between said plates.

22. A rail support comprising a pair of spaced plates, means for rigidly supporting the edge of the upper plate upon the lower plate and forming an enclosed space intermediate said plates, and a vibration absorbing material contained between said enclosed space.

23. A rail support comprising a pair of dished plates in abutting relation at their extending marginal edges, a reinforcing member adjacent said edges, means to mechanically join said edges together and to said reinforcing member and a vibration absorbing material between said plates.

24. A rail support comprising a pair of dished plates in opposed abutting relation at their extending marginal edges, and means to mechanically join said edges.

25. A rail support comprising a pair of dished plates in abutting relation at their extending marginal edges, a reinforcing member adjacent said edges, means to mechanically join said edges together and to said reinforcing member, means in spaced relation to said marginal edges adapted to transmit the load on the rail to said plates, and a vibration absorbing material between said plates.

26. A rail support comprising a pair of dished plates in abutting relation at their extending marginal edges, means to mechanically join said edges together, and means in spaced relation to said marginal edges adapted to transmit the load on the rail to said plates.

27. A rail support comprising a pair of dished plates in opposed abutting relation at their extending marginal edges, and means in spaced relation to said marginal edges adapted to transmit the load on the rail to said plates.

28. A rail support comprising a pair of dished plates in abutting relation at their extending marginal edges, a reinforcing member adjacent said edges, means to mechanically join said edges together and to said reinforcing member, a plate member adapted to support a rail mechanically joined to one of said dished plates, and a vibration absorbing material between said dished plates.

29. A rail support comprising a pair of dished plates in abutting relation at their extending marginal edges, a reinforcing member adjacent said edges, means to mechanically join said edges together, a plate member adapted to support a rail mechanically joined to one of said dished plates.

30. A resilient supporting unit for rails comprising a pair of oppositely disposed dished plates rigidly joined together adjacent their marginal edges to constitute a container and a filling of vibration absorbing material within the container.

31. A resilient support for rails comprising a pair of spaced resilient metallic plates having extending flanges abutting each other.

32. A resilient supporting unit for rails comprising a container for a vibration absorbing material, said container comprising a pair of resilient plates one of which is adapted to flex under a load passing along the rails.

33. In a railway track structure, a resilient support for a rail, said support comprising a container for a vibration absorbing material, said container comprising a pair of plate members in spaced relation to each other, and a substantially continuous supporting member intermediate said plate members adjacent their marginal edges.

34. A resilient supporting member for a rail comprising a pair of spaced plate members, spacing means interposed between said members and means spaced laterally from the marginal edges of one of said plate members adapted to support the rail in a plane above the marginal edges of said plate.

35. In a railway track structure the combination of a foundation member, a rail, a resilient supporting unit interposed between said foundation member and said rail, said unit comprising a pair of plates, spacing means interposed between said plates and means spaced laterally from the marginal edges of one of said plates adapted to engage the foundation member and space the marginal edges of said plate therefrom.

36. In a railroad track structure the combination of a foundation member, a rail, a resilient supporting unit comprising a pair of spaced plates, one of said plates having a support for the rail spaced laterally from the marginal edges of said plate and in a plane above said marginal edges and the other of said plates having a member engaging the foundation member in a plane below the marginal edges of the plates.

37. A resilient anchorage for railroad rails comprising a supporting member, a rail, and a resilient supporting unit interposed between said supporting member and rail adapted to dissipate and absorb vibrations therefrom, said unit comprising a pair of spaced resilient metallic plates joined together about their edges providing a resilient diaphragm, means for supporting said diaphragm on said support from the lower plate, means for supporting the rail from the upper plate, and means for clamping the rail and resilient unit to said supporting member.

38. A resilient supporting unit for rails comprising a pair of spaced plates joined together about their edges and providing a flexible resilient diaphragm, the center portions of the plates being adapted to receive and support the rail and its load.

39. A resilient supporting unit for rails comprising a pair of spaced plates, a ring-like frame member conforming to the peripheral shape of the plates interposed between said plates for spacing the same apart, said plates being joined to said frame to provide a container, the center portion of one of the plates being adapted to carry the weight of the rail and its load.

40. A resilient supporting unit for rails comprising a pair of spaced plates joined together about their edges and providing a flexible resilient diaphragm, the center portion of one of the plates being adapted to receive and support the rail and its load, said diaphragm being filled with a non-metallic vibration absorbing material.

41. A resilient supporting unit for a rail comprising a pair of flanged plates in rigid supported relation adjacent their marginal edges and forming an enclosed space therebetween.

42. A resilient supporting unit for a rail comprising a pair of flanged plates connected adjacent their marginal edges and forming a closed space therebetween, one of said plates adapted to flex under a load passing along the rail.

43. A resilient supporting unit for a rail comprising a pair of flanged plates adapted to flex under a load passing along the rail and a vibration absorbing material between said plates.

44. A resilient supporting unit for a rail comprising a pair of plates, one of said plates having flanges to support the other plate and hold the major portion of said plates in spaced relation and means for mechanically connecting said plates together in rigid supporting relation at their edges.

45. A resilient supporting unit for a rail comprising a pair of plates in spaced relation at their central portions and mechanically joined together at their edges to constitute a container, and in rigid supporting relation at their edges.

IVOR O. MALL.